(12) United States Patent
Hakeem et al.

(10) Patent No.: US 10,330,028 B2
(45) Date of Patent: Jun. 25, 2019

(54) METHOD AND SYSTEM FOR DETERMINING KNOCK CONTROL FLUID COMPOSITION

(71) Applicant: Ford Global Technologies, LLC, Dearborn, MI (US)

(72) Inventors: Mohannad Hakeem, Dearborn, MI (US); Gopichandra Surnilla, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 172 days.

(21) Appl. No.: 14/918,483

(22) Filed: Oct. 20, 2015

(65) Prior Publication Data
US 2017/0107918 A1    Apr. 20, 2017

(51) Int. Cl.
| | | |
|---|---|---|
| *F02D 19/12* | (2006.01) | |
| *F02D 41/14* | (2006.01) | |
| *F02D 41/00* | (2006.01) | |
| *F02P 5/152* | (2006.01) | |
| *F02M 25/022* | (2006.01) | |
| *F02M 25/03* | (2006.01) | |
| *B60S 1/52* | (2006.01) | |
| *B60S 1/50* | (2006.01) | |

(52) U.S. Cl.
CPC ......... *F02D 19/12* (2013.01); *F02D 41/0025* (2013.01); *F02D 41/144* (2013.01); *F02M 25/0228* (2013.01); *F02M 25/03* (2013.01); *F02P 5/152* (2013.01); *B60S 1/50* (2013.01); *F02D 41/1456* (2013.01); *F02P 5/1527* (2013.01); *Y02T 10/46* (2013.01)

(58) Field of Classification Search
CPC .... F02D 19/12; F02D 41/0025; F02D 41/144; F02D 41/1456; F02M 25/022; B60S 1/50; F02P 5/152; F02P 5/1527
See application file for complete search history.

(56) References Cited

U.S. PATENT DOCUMENTS 4,364,370 A * 12/1982 Smith ............... F02B 11/02
                                                  123/1 A
4,424,676 A *  1/1984 Meiners ............ F02D 19/12
                                                  123/25 L
(Continued)

OTHER PUBLICATIONS

Surnilla, Gopichandra et al., "Method and System for Secondary Fluid Injection Control in an Engine," U.S. Appl. No. 14/539,716, filed Nov. 12, 2014, 56 pages.

(Continued)

*Primary Examiner* — Lindsay M Low
*Assistant Examiner* — Brian P Monahon
(74) *Attorney, Agent, or Firm* — Julia Voutyras; McCoy Russell LLP

(57) ABSTRACT

Methods and systems are provided for accurately determining the composition of a knock control fluid using sensors already present in the engine system. An intake or an exhaust oxygen sensor is used to estimate the water and the alcohol content of a knock control fluid that is direct injected into an engine cylinder responsive to an indication of abnormal combustion. A change in the pumping current of the oxygen sensor due to the water content of the knock control fluid is distinguished from a change in the pumping current of the oxygen sensor due to the alcohol content of the knock control fluid.

20 Claims, 6 Drawing Sheets

(56) References Cited

U.S. PATENT DOCUMENTS

| | | | |
|---|---|---|---|
| 4,945,882 A | | 8/1990 | Brown et al. |
| 4,993,386 A | * | 2/1991 | Ozasa ............... F01M 3/02 123/1 A |
| 7,533,651 B2 | * | 5/2009 | Surnilla ............ F02D 17/02 123/1 A |
| 8,495,996 B2 | | 7/2013 | Soltis et al. |
| 8,522,760 B2 | | 9/2013 | Soltis |
| 8,752,534 B2 | | 6/2014 | Soltis |
| 8,857,155 B2 | | 10/2014 | Surnilla et al. |
| 9,057,330 B2 | | 6/2015 | Surnilla et al. |
| 9,109,523 B2 | | 8/2015 | Surnilla et al. |
| 9,234,476 B2 | | 1/2016 | Hakeem et al. |
| 2007/0119414 A1 | * | 5/2007 | Leone ............. F02D 19/0684 123/295 |
| 2007/0215110 A1 | * | 9/2007 | Stein ............... F02D 19/0628 123/431 |
| 2007/0215130 A1 | * | 9/2007 | Shelby ............. F02D 35/027 123/637 |
| 2008/0035115 A1 | * | 2/2008 | Snow ............... F02D 41/0025 123/472 |
| 2009/0065409 A1 | * | 3/2009 | Kamio ............. B01D 11/0492 210/123 |
| 2011/0132340 A1 | * | 6/2011 | Soltis ............... F02D 41/0025 123/703 |
| 2011/0132342 A1 | * | 6/2011 | Soltis ............... F02D 41/0025 123/703 |
| 2011/0313641 A1 | * | 12/2011 | Glugla ............. F02D 35/02 701/104 |
| 2013/0333677 A1 | * | 12/2013 | Surnilla ........... F02D 41/0025 123/674 |
| 2014/0048619 A1 | * | 2/2014 | Snow ............... F02M 25/028 239/71 |
| 2015/0027103 A1 | | 1/2015 | Surnilla et al. |
| 2015/0057910 A1 | | 2/2015 | Surnilla et al. |
| 2015/0075502 A1 | | 3/2015 | Surnilla et al. |
| 2015/0075503 A1 | | 3/2015 | Surnilla et al. |
| 2015/0121864 A1 | | 5/2015 | Surnilla et al. |
| 2015/0192084 A1 | | 7/2015 | Surnilla et al. |
| 2015/0292429 A1 | | 10/2015 | Surnilla et al. |

OTHER PUBLICATIONS

Surnilla, Gopichandra et al., "Methods and Systems for Humidity Determination Via an Oxygen Sensor," U.S. Appl. No. 14/626,308, filed Feb. 19, 2015, 40 pages.

Makled, Daniel A. et al., "Methods and System for Fuel Ethanol Content Estimation and Engine Control," U.S. Appl. No. 14/626,623, filed Feb. 19, 2015, 68 pages.

Hakeem, Mohannad et al., "Method and System for an Oxygen Sensor," U.S. Appl. No. 14/663,243, filed Mar. 19, 2015, 57 pages.

Hakeem, Mohannad Hakeem et al., "Method and System for Determining Knock Control Fluid Composition," U.S. Appl. No. 14/918,475, filed Oct. 20, 2015, 58 pages.

"BMW reveals M4 safety car with innovating water injection system," autoblog, http://www.autoblog.com/2015/02/13/bmw-reveals-m4-safety-carwith-innovating-water-injection-system/, Updated Feb. 13, 2015, 1-5 pages, Accessed Jan. 8, 2016.

* cited by examiner

METHOD AND SYSTEM FOR DETERMINING KNOCK CONTROL FLUID COMPOSITION

FIELD

The present description relates generally to methods and systems for determining the composition of a wiper fluid injected into an engine for knock control.

BACKGROUND/SUMMARY

A variety of knock control fluids have been developed to mitigate abnormal combustion events, including various combinations of gasoline, ethanol, methanol, other alcohols, water, and other inert fluids. Water injection, for example, reduces knock, provides charge cooling, and reduces the octane requirement. In addition, since water injection can also be used for engine dilution control, the need for a dedicated knock control fluid is reduced.

Another example of a knock control fluid is shown by Surnilla in U.S. Pat. No. 7,533,651. Therein, direct injection of a washer fluid, which includes water and alcohol (e.g., engine coolant or methanol) leverages the charge cooling properties of the both the fluid and the direct injection to reduce knock. In addition to protecting the water from freezing, the inclusion of engine coolant in the composition of the injected knock control fluid offers an added advantage of having light hydrocarbons (such as methanol), which help in the combustion process. The overall approach increases engine efficiency while reducing the octane requirement of injected fuel, thereby increasing the power output of the engine. Herein, the wiper fluid can be repurposed for knock control in addition to being used for cleaning a vehicle windshield.

However, the inventors herein have recognized an issue with the approach. There may be variations in windshield wiper fluid composition. For example, there may be a wide variation in the ethanol or methanol content of the fluid, as such. In addition, when a windshield wiper fluid tank is refilled, based on an amount and composition of wiper fluid that was left over in the tank, the composition of the available wiper fluid following the refilling may vary. While this does not affect the fluid's ability to clean a windshield wiper, it may affect the knock controlling ability of the fluid. For example, the octane value of the fluid may change. As such, various engine parameters are adjusted based on the injected knock control fluid. For example, based on the alcohol content of the injected fluid, cylinder fueling may be adjusted. In addition, engine parameters may need to be adjusted based on the type of alcohol in the fluid (e.g., whether the alcohol is ethanol or methanol). As a result, errors in the estimation of a wiper fluid composition can result in significant air-fuel errors, degrading engine performance. Further, if the composition of a wiper fluid is not accurately known, use of wiper fluid as a knock control fluid may be limited. On the other hand, the addition of a sensor dedicated to estimating the alcohol content and composition of a knock control fluid may add significant cost and complexity.

In one example, the issues described above may be addressed by a method for an engine comprising: injecting an amount of a water-alcohol blend into an engine intake; modulating a reference voltage applied to an exhaust gas oxygen sensor; monitoring a change in pumping current of the sensor; learning a first portion of the change in pumping current due to a water content of the blend; and learning a second portion of the change in pumping current due to an alcohol content of the blend. In this way, the composition of a knock control fluid injected into an engine can be accurately determined using existing engine sensors.

As an example, following refilling of a wiper fluid tank, a wiper fluid composition may be estimated using an exhaust gas oxygen sensor (such as a UEGO sensor). The wiper fluid may then be used as a knock control fluid. As such, the wiper fluid may include a mixture of water and alcohol but no gasoline. Further, an alcohol type in the fluid may be known a priori. For example, it may be known that the wiper fluid is a water-ethanol mixture, or a water-methanol mixture. However, a ratio of water to the specified alcohol in the fluid may not be accurately known. A controller may inject a defined mass of the knock control fluid into the engine intake, such as into the intake manifold, downstream of an intake throttle. The fluid may be injected during engine non-fueling conditions, such as while EGR, fuel vapor purge, and crankcase ventilation are disabled, to reduce interference on the results from unintended hydrocarbons. Following the injection, a reference voltage of the exhaust oxygen sensor may be modulated between a first, lower voltage (e.g., 450 mV) and a second, higher voltage (e.g., 950 mV). A change in the pumping current of the sensor may be noted. As such, the pumping current may be affected by a reduction in the oxygen concentration at the oxygen sensor due to the water content of the knock control fluid as well as due to the alcohol content of the knock control fluid. Specifically, the water in the knock control fluid may have a dilution effect on the oxygen sensor while the alcohol in the knock control fluid may combust with oxygen at the sensor, reducing the oxygen concentration at the sensor. An engine controller may then calculate the alcohol content of the knock control fluid based on a change in the pumping current, as well as the knock control fluid injection amount. For example, the engine controller may reference a 3D calibration map to estimate the alcohol content of the fluid and update the composition of the fluid. By learning the composition of the fluid, the flexibility of usage of the wiper fluid as a knock control fluid may be enhanced.

In this way, an exhaust oxygen sensor can be used to estimate the composition (including the hydrocarbon type and alcohol content) of a knock control fluid. The technical effect of applying a reference voltage to the exhaust oxygen sensor is that a portion of the pumping current of the sensor that is attributed to the water component of the knock control fluid can be better distinguished from the portion attributed to the alcohol component of the knock control fluid. This is due to the fact that the dilution effect on the oxygen sensor has a remarkably different contribution than the combustion effect of the alcohol. By better estimating the composition of an injected knock control fluid, the use of the knock control fluid may be expanded to engines of different fuel types, improving the robustness of the system. In addition, the accuracy of fuel octane estimates may be increased, which allows spark control to be improved. For example, spark retard usage for knock control may be reduced providing fuel economy benefits. By using an existing exhaust oxygen sensor to determine the composition of the knock control fluid, the need for a dedicated sensor is reduced without compromising on the accuracy of the estimation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
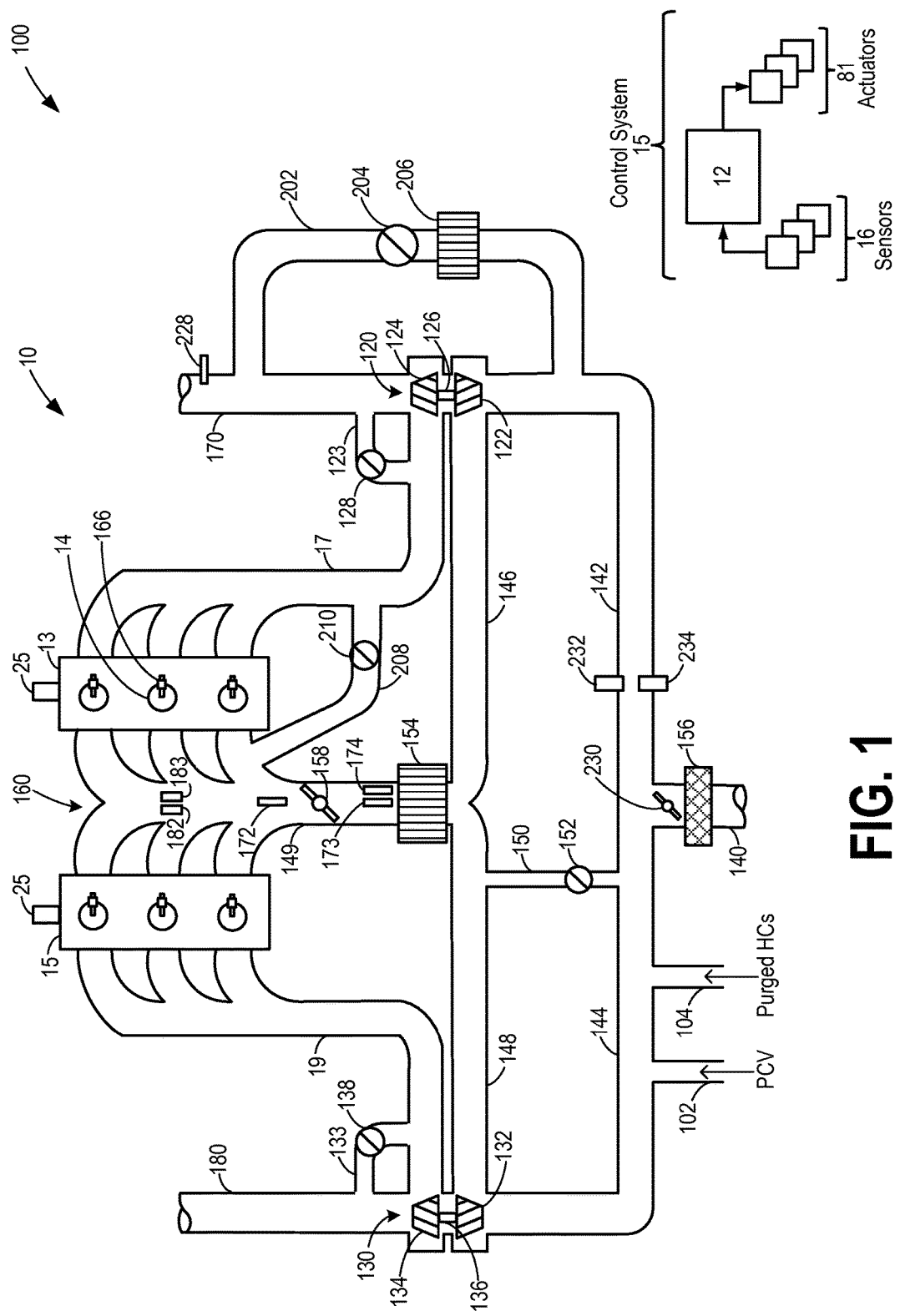
FIG. 1 shows a schematic diagram of an engine system.
Figure 2:
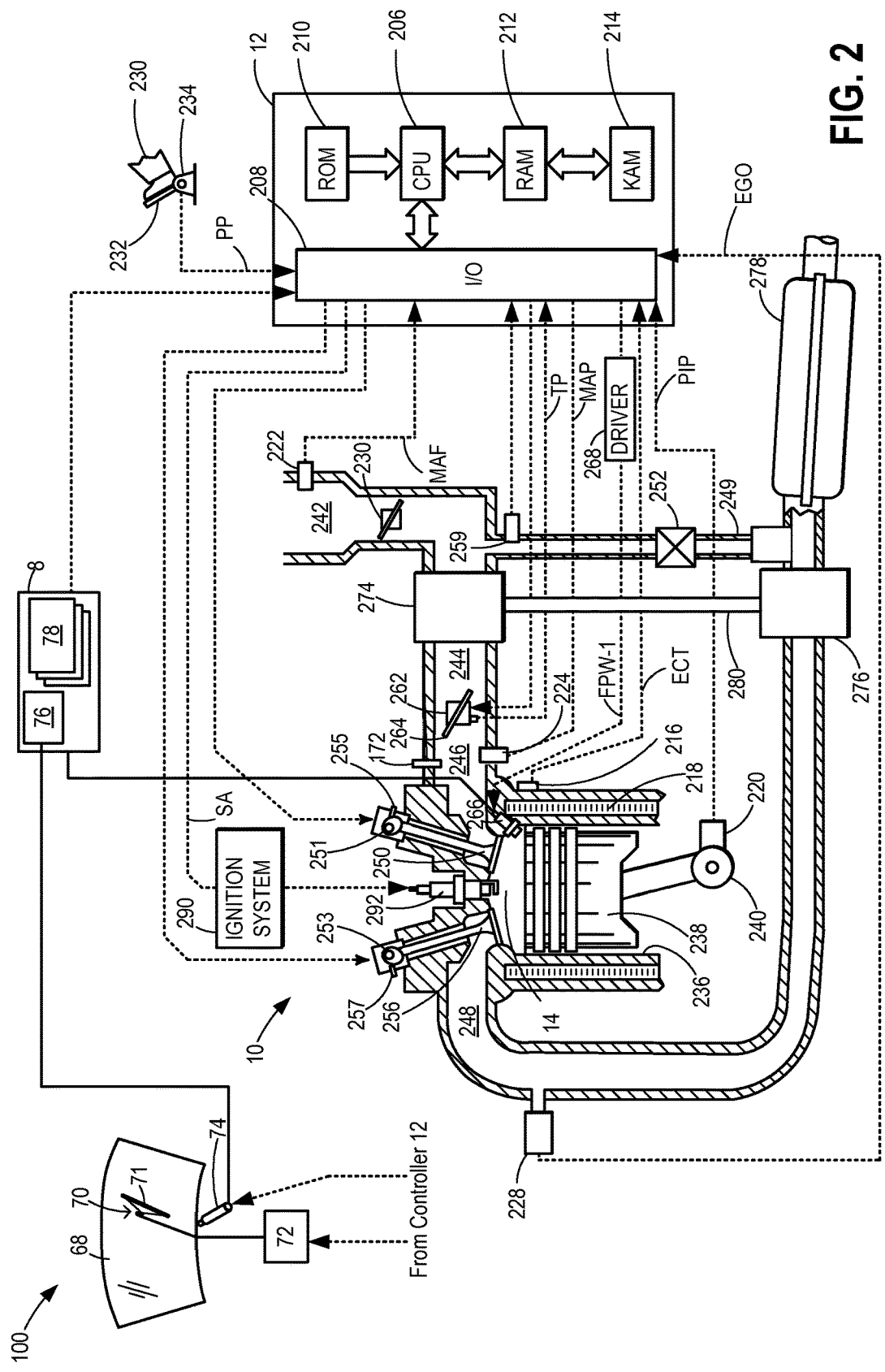
FIG. 2 shows a detailed diagram of an engine combustion chamber.
Figure 3:
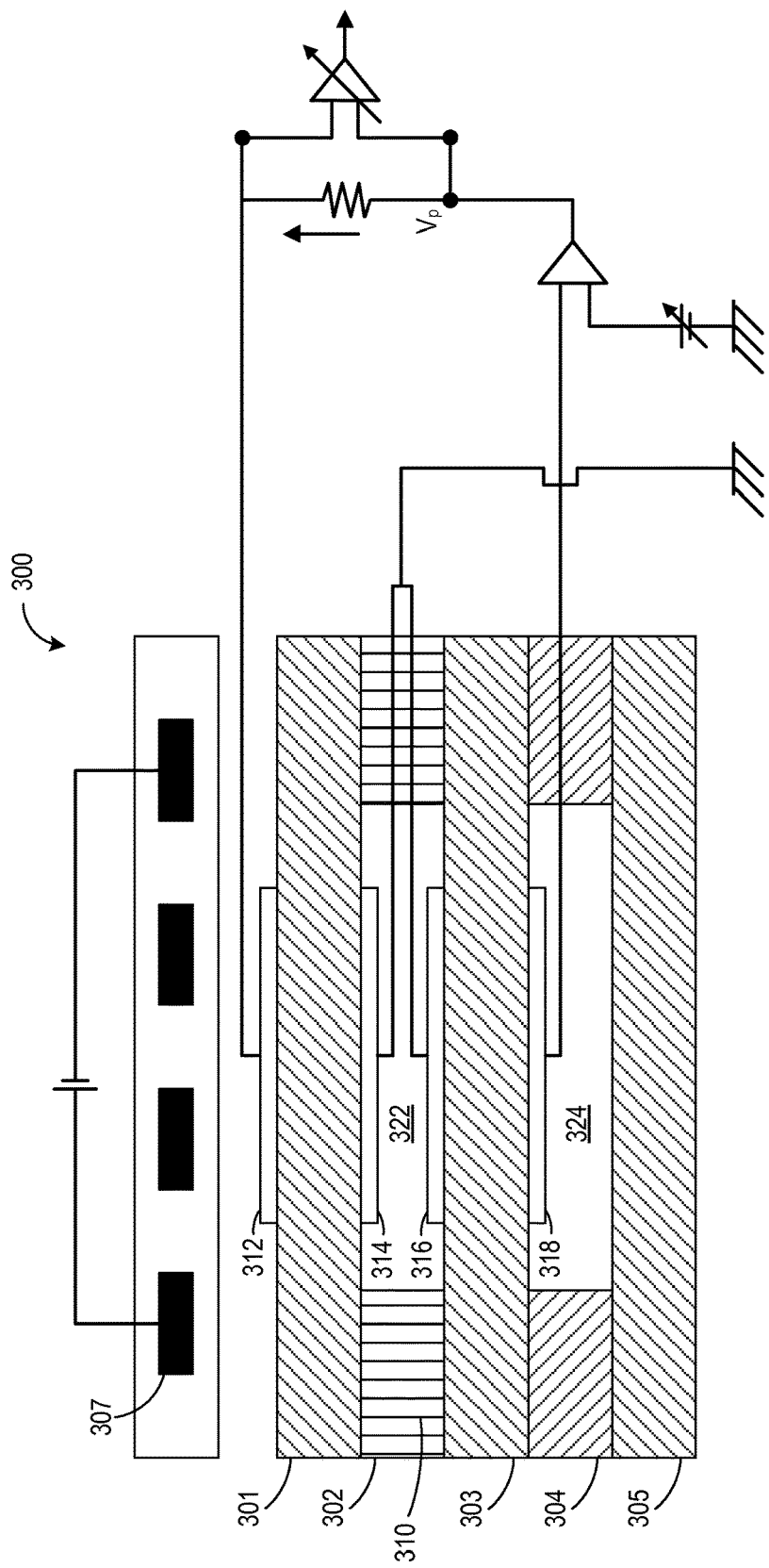
FIG. 3 shows a schematic diagram of an example oxygen sensor.

The following description relates to systems and methods for determining the composition of a knock control fluid injected into an engine, such as the engine of FIGS. 1-2, based on outputs from an intake oxygen sensor, such as the sensor of FIG. 3. As such, the intake oxygen sensor may be used during different engine operating conditions to estimate the alcohol content of a fuel delivered to the engine during engine combustion, or the alcohol composition of the knock control fluid delivered to the engine responsive to an indication of knock (FIG. 3). An engine controller may be configured to perform a control routine, such as the example routine of FIGS. 4-5, to estimate the composition of the knock control fluid, including the alcohol content and the hydrocarbon content of the fluid, based on a change in the pumping current of the intake oxygen sensor upon modulation of a reference voltage. The controller may reference a map, such as the example map of FIG. 6, to correlate the change in pumping current and the injection mass with the alcohol content of the injected fluid. One or more engine operating parameters such as spark timing and/or fuel injection amount may be adjusted based on the determined composition of the knock control fluid. In this manner, engine knock control fluid usage may be expanded.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156 and an EGR throttle valve 131. Engine system 100 may be a split-engine system wherein intake passage 140 is branched downstream of EGR throttle valve 131 into first and second parallel intake passages, each including a turbocharger compressor. Specifically, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

A first EGR throttle valve 131 may be positioned in the engine intake upstream of the first and second parallel intake passages 142 and 144, while a second air intake throttle valve 158 may be positioned in the engine intake downstream of the first and second parallel intake passages 142 and 144, and downstream of the first and second parallel branched intake passages 146 and 148, for example, in common intake passage 149.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include a charge air cooler (CAC) 154 and/or a throttle (such as second throttle valve 158). The position of throttle valve 158 can be adjusted by the control system via a throttle actuator (not shown) communicatively coupled to controller 12. An anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value.

Intake manifold 160 may further include an intake gas oxygen sensor 172. In one example, the oxygen sensor is a UEGO sensor, such as the example UEGO sensor of FIG. 3. As elaborated herein, the intake gas oxygen sensor may be configured to provide an estimate regarding the oxygen content of fresh air received in the intake manifold. In addition, when EGR is flowing, a change in oxygen concentration at the sensor may be used to infer an EGR amount and used for accurate EGR flow control. Further still, during selected fueling conditions, the reference voltage of the sensor may be modulated and the corresponding change in current may be used to infer the alcohol content of an injected fuel. As also elaborated herein, during conditions when a knock control fluid is injected, the reference voltage of the sensor may be modulated and the corresponding change in current may be used to infer and distinguish the water content of the injected fluid from the alcohol content of the injected fluid. In the depicted example, oxygen sensor 162 is positioned upstream of throttle 158 and downstream of charge air cooler 154. However, in alternate embodiments, the oxygen sensor may be positioned upstream of the CAC.

A pressure sensor 174 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 174 is a TIP sensor. In alternate examples, the reference intake pressure is a manifold pressure (MAP) as sensed by MAP sensor 182.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas flowing through exhaust passage 19 can bypass turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors.

Engine 10 may further include one or more exhaust gas recirculation (EGR) passages, or loops, for recirculating at least a portion of exhaust gas from the exhaust manifold to the intake manifold. These may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously.

In the depicted example, engine 10 may include a low-pressure EGR loop 202 for recirculating at least some exhaust gas from the first branched parallel exhaust passage 170, downstream of the turbine 124, to the first parallel intake passage 142, upstream of the compressor 122. In some embodiments, a second low-pressure EGR loop (not shown) may be likewise provided for recirculating at least some exhaust gas from the second branched parallel exhaust passage 180, downstream of the turbine 134, to the second parallel intake passage 144, upstream of the compressor 132. LP-EGR loop 202 may include LP-EGR valve 204 for controlling an EGR flow (i.e., an amount of exhaust gas recirculated) through the loops, as well as an EGR cooler 206 for lowering a temperature of exhaust gas flowing through the EGR loop before recirculation into the engine intake. Under certain conditions, the EGR cooler 206 may also be used to heat the exhaust gas flowing through LP-EGR loop 202 before the exhaust gas enters the compressor to avoid water droplets impinging on the compressors.

Engine 10 may further include a first high-pressure EGR loop 208 for recirculating at least some exhaust gas from the first parallel exhaust passage 17, upstream of the turbine 124, to intake manifold 160, downstream of intake throttle 158. Likewise, the engine may include a second high-pressure EGR loop (not shown) for recirculating at least some exhaust gas from the second parallel exhaust passage 18, upstream of the turbine 134, to the second branched parallel intake passage 148, downstream of the compressor 132. EGR flow through HP-EGR loops 208 may be controlled via HP-EGR valve 210.

A PCV port 102 may be configured to deliver crankcase ventilation gases (blow-by gases) to the engine intake manifold along second parallel intake passage 144. In some embodiments, flow of PCV air through PCV port 102 may be controlled by a dedicated PCV port valve. Thus, when the PCV valve is closed, crankcase ventilation to the engine intake is disabled. Likewise, a purge port 104 may be configured to deliver purge gases from a fuel system canister to the engine intake manifold along passage 144. In some embodiments, flow of purge air through purge port 104 may be controlled by a dedicated purge port valve. Thus, when the purge valve is closed, fuel vapor purging to the engine intake is disabled Humidity sensor 112 and pressure sensor 114 may be included in only one of the parallel intake passages (herein, depicted in the first parallel intake air passage 142 but not in the second parallel intake passage 144), downstream of EGR throttle valve 131. Specifically, the humidity sensor and the pressure sensor may be included in the intake passage not receiving the PCV or purge air. Humidity sensor 112 may be configured to estimate a relative humidity of the intake air. In one embodiment, humidity sensor 112 is an oxygen sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor. Pressure sensor 114 may be configured to estimate a pressure of the intake air. In some embodiments, a temperature sensor may also be included in the same parallel intake passage, downstream of the EGR throttle valve 131.

Intake oxygen sensor 172 may be used, during selected conditions, for estimating an intake oxygen concentration and inferring an amount of EGR dilution at the engine based on a change in the intake oxygen concentration upon opening of the EGR valve 204. For example, upon applying a reference voltage (Vs) to the sensor, a pumping current (Ip) is output by the sensor. The change in oxygen concentration may be proportional to the change in pumping current (delta Ip) output by the sensor. Likewise, during other selected conditions, intake oxygen sensor 172 may be used for estimating the water content of intake charge (that is, ambient humidity) or the water content of an injected fuel (and inferring the alcohol content of the injected fuel). Further still, as elaborated herein, during other conditions, the intake oxygen sensor may be used for estimating the water content and alcohol content of a knock control fluid and estimating a composition of the knock control fluid accordingly. In one example, the knock control fluid is a wiper fluid. The reference voltage (Vs) may be applied to the sensor and a change in pumping current (Ip) output by the sensor may be learned. A first portion of the change in pumping current (delta Ip) output by the sensor that is due to the water content of the injected knock control fluid may be learned, and distinguished from a second portion of the change in pumping current that is due to the alcohol content of the injected knock control fluid.

In still other examples, an exhaust gas oxygen sensor, such as sensor 248 of FIG. 2 may be used, during selected conditions, for estimating one or more of the water content of an injected fuel (and inferring the alcohol content of the injected fuel), a ratio of the water content relative to alcohol content of a knock control fluid. Estimating a composition of the knock control fluid may include modulating the reference voltage applied to the sensor between a higher and a lower voltage, and learning a change in pumping current (Ip) output by the sensor. A first portion of the change in pumping current (delta Ip) output by the sensor that is due to the water content of the injected knock control fluid may be learned, and distinguished from a second portion of the change in pumping current that is due to the alcohol content of the injected knock control fluid.

The position of intake and exhaust valves of each cylinder 14 may be regulated via hydraulically actuated lifters coupled to valve pushrods, or via a direct acting mechanical bucket system in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by a control system 15 including controller 12 and by input from a vehicle operator via an input device (not shown). Control system 15 is shown receiving information from a plurality of sensors 16 (various examples of which are described herein at FIG. 1 and FIG. 2) and sending control signals to a plurality of actuators 81. As one example, sensors 16 may include humidity sensor 112, intake air pressure sensor 114, MAP sensor 182, MCT sensor 183, TIP sensor 174, and intake air oxygen sensor 172. In some examples, common intake passage 149 may further include a throttle inlet temperature sensor for estimating a throttle air temperature (TCT). In other examples, one or more of the EGR passages may include pressure, temperature, and air-to-fuel ratio sensors, for determining EGR flow characteristics. As another example, actuators 81 may include fuel injector 166, HP-EGR valves 210 and 220, LP-EGR valves 204 and 214, throttle valves 158 and 131, and wastegates 128, 138. Other actuators, such as a variety of additional valves and throttles, may be coupled to various locations in engine system 100, such as those described with reference to FIG. 2. The controller 12 receives signals from the various sensors of FIG. 1 (and FIG. 2) and employs the various actuators of FIG. 1 (and FIG. 2) to adjust engine operation based on the received signals and instructions stored on a memory of the controller. For example, controller 12 may receive input data from the various sensors, process the input data, and trigger the actuators in response to the processed input data based on instruction or code programmed therein corresponding to one or more routines. Example control routines are described herein with regard to FIGS. 4-5.

FIG. 2 depicts a detailed embodiment of a combustion chamber, such as a combustion chamber of engine 10 of FIG. 1. Components previously introduced in FIG. 1 are numbered similarly and not reintroduced.

Engine 10 may receive control parameters from a control system including controller 12 and input from a vehicle operator 230 via an input device 232. In this example, input device 232 includes an accelerator pedal and a pedal position sensor 234 for generating a proportional pedal position signal PP. Cylinder (herein also "combustion chamber") 14 of engine 10 may include combustion chamber walls 236 with piston 238 positioned therein. Piston 238 may be coupled to crankshaft 240 so that reciprocating motion of the piston is translated into rotational motion of the crankshaft. Crankshaft 240 may be coupled to at least one drive wheel of the passenger vehicle via a transmission system. Further, a starter motor may be coupled to crankshaft 240 via a flywheel to enable a starting operation of engine 10.

Engine 10 is coupled in a vehicle system 100 that includes a windshield wiper system that enables cleaning of a vehicle windshield 68. Windshield 68 may be a front or rear windshield of a vehicle. The windshield wiper system includes at least one windshield wiper 70 operated by wiper motor 72. In response to an operator demand, and based on input from controller 12, wiper motor 72 may be energized causing wiper 70 to make multiple sweeping cycles known as wipes or sweeps over windshield 68. The wipes or sweeps enable wiper blade 71 to remove moisture, debris, and foreign particles from the surface of windshield 68. While operating wiper motor 72 and while wiper blade 71 is sweeping, based on request from a vehicle operator, controller 12 may intermittently inject or squirt a wiper fluid onto the windshield via wiper injector 74. Wiper fluid may be stored in a reservoir 76 from where it is delivered to the windshield. As elaborated herein, reservoir 76 may be further coupled to the intake passage as well as the engine cylinder. This allows the wiper fluid to be injected to provide knock control in addition to being used for windshield wiping purposes. Specifically, the wiper fluid may be injected into the intake manifold, specifically into intake passage 246, downstream of the intake throttle, during knock conditions, thereby enabling the windshield wiper fluid to be used as a knock control fluid. Additionally, or alternatively, windshield wiper fluid may be directed injected into an engine cylinder via direct injector, such as via the direct fuel injector or a dedicated direct fuel injector, to provide knock control. The wiper fluid stored in reservoir 76 may include a combination of water and alcohol, such as methanol or isopropanol. However, the wiper fluid does not contain any gasoline.

As such, there may be significant variation in the water: alcohol content of the wiper fluid. To enable the wiper fluid to be reliably used as a knock control fluid, a composition of the wiper fluid may need to be known. As elaborated with reference to FIG. 1, during selected conditions, such as immediately after the wiper fluid reservoir has been refilled, an intake oxygen sensor, such as sensor 172, may be used to estimate the water to alcohol content of the wiper fluid. Alternatively, an exhaust gas oxygen sensor, such as sensor 228, may be used to estimate the water to alcohol content of the wiper fluid. Example methods for estimating a wiper fluid composition using an intake or exhaust oxygen sensor is shown with reference to FIGS. 4-5.

Cylinder 14 can receive intake air via a series of intake air passages 242, 244, and 246. Intake air passage 246 may communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 274 arranged between intake passages 242 and 244, and an exhaust turbine 276 arranged along exhaust passage 248. Compressor 274 may be at least partially powered by exhaust turbine 276 via a shaft 280 where the boosting device is configured as a turbocharger. However, in other examples, such as where engine 10 is provided with a supercharger, exhaust turbine 276 may be optionally omitted, where compressor 274 may be powered by mechanical input from a motor or the engine. A throttle 262 including a throttle plate 264 may be provided along an intake passage of the engine for varying the flow rate and/or pressure of intake air provided to the engine cylinders. For example, throttle 262 may be disposed downstream of compressor 274 as shown in FIG. 2, or alternatively may be provided upstream of compressor 274.

Exhaust passage 248 may receive exhaust gases from other cylinders of engine 10 in addition to cylinder 14. Exhaust gas sensor 228 is shown coupled to exhaust passage 248 upstream of emission control device 278. Sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 278 may be a three way catalyst (TWC), NOx trap, various other emission control devices, or combinations thereof.

Exhaust temperature may be measured by one or more temperature sensors (not shown) located in exhaust passage 248. Alternatively, exhaust temperature may be inferred based on engine operating conditions such as speed, load, air-fuel ratio (AFR), spark retard, etc. Further, exhaust temperature may be computed by one or more exhaust gas sensors 228. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 250 and at least one exhaust poppet valve 256 located at an upper region of cylinder 14. In some embodiments, each cylinder of engine 10, including cylinder 14, may include at least two intake poppet valves and at least two exhaust poppet valves located at an upper region of the cylinder.

Intake valve 250 may be controlled by controller 12 by cam actuation via cam actuation system 251. Similarly, exhaust valve 256 may be controlled by controller 12 via cam actuation system 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 250 and exhaust valve 256 may be determined by valve position sensors (not shown) and/or camshaft position sensors 255 and 257, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 238 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 292 for initiating combustion. Ignition system 290 can provide an ignition spark to combustion chamber 14 via spark plug 292 in response to spark advance signal SA from controller 12, under select operating modes. However, in some embodiments, spark plug 292 may be omitted, such as where engine 10 may initiate combustion by auto-ignition or by injection of fuel as may be the case with some diesel engines.

In some embodiments, each cylinder of engine 10 may be configured with one or more injectors for providing a knock control fluid thereto. In some embodiments, the knock control fluid may be a fuel, wherein the injector is also referred to as a fuel injector. As a non-limiting example, cylinder 14 is shown including one fuel injector 266. Fuel injector 266 is shown coupled directly to cylinder 14 for injecting fuel directly therein in proportion to the pulse width of signal FPW received from controller 12 via electronic driver 268. In this manner, fuel injector 166 provides what is known as direct injection (hereafter also referred to as "DI") of fuel into combustion cylinder 14. While FIG. 1 shows injector 266 as a side injector, it may also be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 266 from a high pressure fuel system 8 including one or more fuel tanks 78, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, fuel tanks 78 may have a pressure transducer providing a signal to controller 12. It will be appreciated that, in an alternate embodiment, injector 266 may be a port injector providing fuel into the intake port upstream of cylinder 14.

Fuel may be delivered by the injector to the cylinder during a single cycle of the cylinder. Further, the distribution and/or relative amount of fuel delivered from the injector may vary with operating conditions, such as aircharge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks 78 in fuel system 8 may hold fuel or knock control fluids with different qualities, such as different compositions. These differences may include different alcohol content, different water content, different octane, different heat of vaporizations, different fuel blends, different water contents, different flammability limits, and/or combinations thereof etc. In one example, knock control fluids with different alcohol contents could include one fuel being gasoline and the other being ethanol or methanol. Other alcohol containing fuels could be a mixture of alcohol and water, a mixture of alcohol, water, etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of the fuel or knock control fluid stored in the fuel tank may vary frequently. The day to day variations in tank refilling can thus result in frequently varying fuel compositions, thereby affecting the fuel composition delivered by injector 166.

In addition to the fuel tanks, fuel system 8 may also include a reservoir 76 for storing a knock control fluid, herein windshield wiper fluid. While reservoir 76 is depicted as being distinct from the one or more fuel tanks 78, it will be appreciated that in alternate examples, reservoir 76 may be one of the one of more fuel tanks 78. Reservoir 76 may be coupled to direct injector 266 so that wiper fluid can be directly injected into cylinder 14. During some conditions, in response to an indication of knock, an engine controller may inject wiper fluid, being using as a knock control fluid, into the intake manifold, downstream of the intake throttle, to increase engine dilution and thereby control the untimely and unwanted detonation event. Alternatively, or additionally, in response to an indication of knock, the engine controller may directly inject wiper fluid, being using as a knock control fluid, into the engine cylinder to increase engine dilution and thereby control the untimely and unwanted detonation event In some embodiments, the fuel system may also include a reservoir for storing water that is coupled to the direct injector so that water may be direct injected into the cylinder. As such, by injecting water, "liquid EGR" is provided, which enables substantial EGR benefits to be achieved. However, during conditions when liquid needs to be conserved, or when a back-up is required for when liquid EGR is not present, external EGR system may be added.

The engine may further include one or more exhaust gas recirculation passages for diverting at least a portion of exhaust gas from the engine exhaust to the engine intake.

FIG. 2 shows a low pressure EGR (LP-EGR) system, but an alternative embodiment may include only a high pressure EGR (HP-EGR) system, or a combination of both LP-EGR and HP-EGR systems. The LP-EGR is routed through LP-EGR passage 249 from downstream of turbine 276 to upstream of compressor 274. The amount of LP-EGR provided to intake manifold 244 may be varied by controller 12 via LP-EGR valve 252. The LP-EGR system may include LP-EGR cooler 258 to reject heat from the EGR gases to engine coolant, for example. When included, the HP-EGR system may route HP-EGR through a dedicated HP-EGR passage (not shown) from upstream of turbine 276 to downstream of compressor 274 (and upstream of intake throttle 262), via an HP-EGR cooler. The amount of HP-EGR provided to intake manifold 244 may be varied by controller 12 via an HP-EGR valve (not shown).

Under some conditions, the EGR system may be used to regulate the temperature of the air and fuel mixture within combustion chamber 14. Thus, it may be desirable to measure or estimate the EGR mass flow. For example, one or more sensors 259 may be positioned within LP-EGR passage 249 to provide an indication of one or more of a pressure, temperature, and air-fuel ratio of exhaust gas recirculated through the LP-EGR passage. Exhaust gas diverted through LP-EGR passage 249 may be diluted with fresh intake air at a mixing point located at the junction of LP-EGR passage 249 and intake passage 242. In some examples, where an air intake system (AIS) throttle is included in intake passage 242, upstream of compressor 274, by adjusting LP-EGR valve 252 in coordination with the air intake system throttle, a dilution of the EGR flow may be adjusted.

A percent dilution of the LP-EGR flow may be inferred from the output of a sensor in the engine intake gas stream. For example, a sensor 172 positioned downstream of LP-EGR valve 252, and upstream of main intake throttle 262, may be used so that the LP-EGR dilution at or close to the main intake throttle may be accurately determined. Sensor 172 may be, for example, an oxygen sensor. In addition, during selected conditions, sensor 172 may be used for estimating the alcohol content of fuel delivered to the engine, as well as the alcohol content and composition of a knock control fluid delivered to cylinder 14.

Controller 12 is shown in FIG. 2 as a microcomputer, including microprocessor unit 206, input/output ports 208, an electronic storage medium for executable programs and calibration values shown as read only memory chip 210 in this particular example, random access memory 212, keep alive memory 214, and a data bus. Controller 12 may receive various signals from sensors coupled to engine 10, in addition to those signals previously discussed, including measurement of inducted mass air flow (MAF) from mass air flow sensor 222; engine coolant temperature (ECT) from temperature sensor 216 coupled to cooling sleeve 218; a profile ignition pickup signal (PIP) from Hall effect sensor 220 (or other type) coupled to crankshaft 240; throttle position (TP) from a throttle position sensor; and manifold absolute pressure signal (MAP) from sensor 224. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system. Controller 12 may also receive an operator request for windshield wiping via a dedicated sensor (not shown). In response to the signals received from the various sensors, the controller may operate various engine actuators. Example actuators include fuel injector 266, wiper motor 72, wiper injector 74, throttle 262, cams 251 and 253, etc. Storage medium read-only memory 210 can be programmed with computer readable data representing instructions executable by processor 206 for performing the methods described below as well as other variants that are anticipated but not specifically listed. Example routines that may be performed are elaborated with reference to FIGS. 4-5.

Next, FIG. 3 shows a schematic view of an example embodiment of an oxygen sensor 300 configured to measure a concentration of oxygen ($O_2$) in an intake aircharge stream. Sensor 300 may operate as intake oxygen sensor 172 of FIGS. 1-2, or exhaust gas oxygen sensor 226 of FIGS. 1-2, for example. Sensor 300 comprises a plurality of layers of one or more ceramic materials arranged in a stacked configuration. In the embodiment of FIG. 3, five ceramic layers are depicted as layers 301, 302, 303, 304, and 305. These layers include one or more layers of a solid electrolyte capable of conducting ionic oxygen. Examples of suitable solid electrolytes include, but are not limited to, zirconium oxide-based materials. Further, in some embodiments, a heater 307 may be disposed in thermal communication with the layers to increase the ionic conductivity of the layers. While the depicted oxygen sensor is formed from five ceramic layers, it will be appreciated that the oxygen sensor may include other suitable numbers of ceramic layers.

Layer 302 includes a material or materials creating a diffusion path 310. Diffusion path 310 is configured to introduce intake gases into a first internal cavity 322 via diffusion. Diffusion path 310 may be configured to allow one or more components of exhaust gases, including but not limited to a desired analyte (e.g., $O_2$), to diffuse into internal cavity 322 at a more limiting rate than the analyte can be pumped in or out by pumping electrodes pair 312 and 314. In this manner, a stoichiometric level of $O_2$ may be obtained in the first internal cavity 322. Sensor 300 further includes a second internal cavity 324 within layer 304 separated from the first internal cavity 322 by layer 303. The second internal cavity 324 is configured to maintain a constant oxygen partial pressure equivalent to a stoichiometric condition, e.g., an oxygen level present in the second internal cavity 324 is equal to that which the exhaust gas would have if the air-fuel ratio was stoichiometric. Herein, second internal cavity 324 may be referred to as a reference cell. As shown, the reference voltage is variable (e.g., between 0 and 1300 mV).

A pair of sensing electrodes 316 and 318 is disposed in communication with first internal cavity 322 and reference cell 324. The sensing electrodes pair 316 and 318 detects a concentration gradient that may develop between the first internal cavity 322 and the reference cell 324 due to an oxygen concentration in the intake air that is higher than or lower than the stoichiometric level. A high oxygen concentration may be caused by a lean charge mixture, while a low oxygen concentration may be caused by a rich charge mixture.

A pair of pumping electrodes 312 and 314 is disposed in communication with internal cavity 322, and is configured to electrochemically pump a selected gas constituent (e.g., $O_2$) from internal cavity 322 through layer 301 and out of sensor 300. Alternatively, the pair of pumping electrodes 312 and 314 may be configured to electrochemically pump a selected gas through layer 301 and into internal cavity 322. Herein, pumping electrodes pair 312 and 314 may be referred to as an $O_2$ pumping cell.

Electrodes 312, 314, 316, and 318 may be made of various suitable materials. In some embodiments, electrodes 312, 314, 316, and 318 may be at least partially made of a material that catalyzes the dissociation of molecular oxygen. Examples of such materials include, but are not limited to, electrodes containing platinum and/or silver.

The process of electrochemically pumping the oxygen out of or into internal cavity 322 includes applying a voltage $V_p$ across pumping electrode pair 312 and 314. The pumping voltage $V_p$ applied to the $O_2$ pumping cell pumps oxygen into or out of first internal cavity 322 in order to maintain a stoichiometric level of oxygen in the cavity pumping cell. The resulting pumping current $I_p$ is proportional to the concentration of oxygen in the exhaust gas. A control system (not shown in FIG. 3) generates the pumping current signal $I_p$ as a function of the intensity of the applied pumping voltage $V_p$ required to maintain a stoichiometric level within the first internal cavity 322. Thus, a lean mixture will cause oxygen to be pumped out of internal cavity 322 and a rich mixture will cause oxygen to be pumped into internal cavity 322. Further, the output gain of the pumping current may be varied via the variable gain operational amplifier (e.g., op-amp). By varying the reference voltage and the output gain of the op-amp, the oxygen sensor may provide a higher resolution signal.

It should be appreciated that the oxygen sensor described herein is merely an example embodiment of an oxygen sensor, and that other embodiments of oxygen sensors may have additional and/or alternative features and/or designs.

Figure 4:
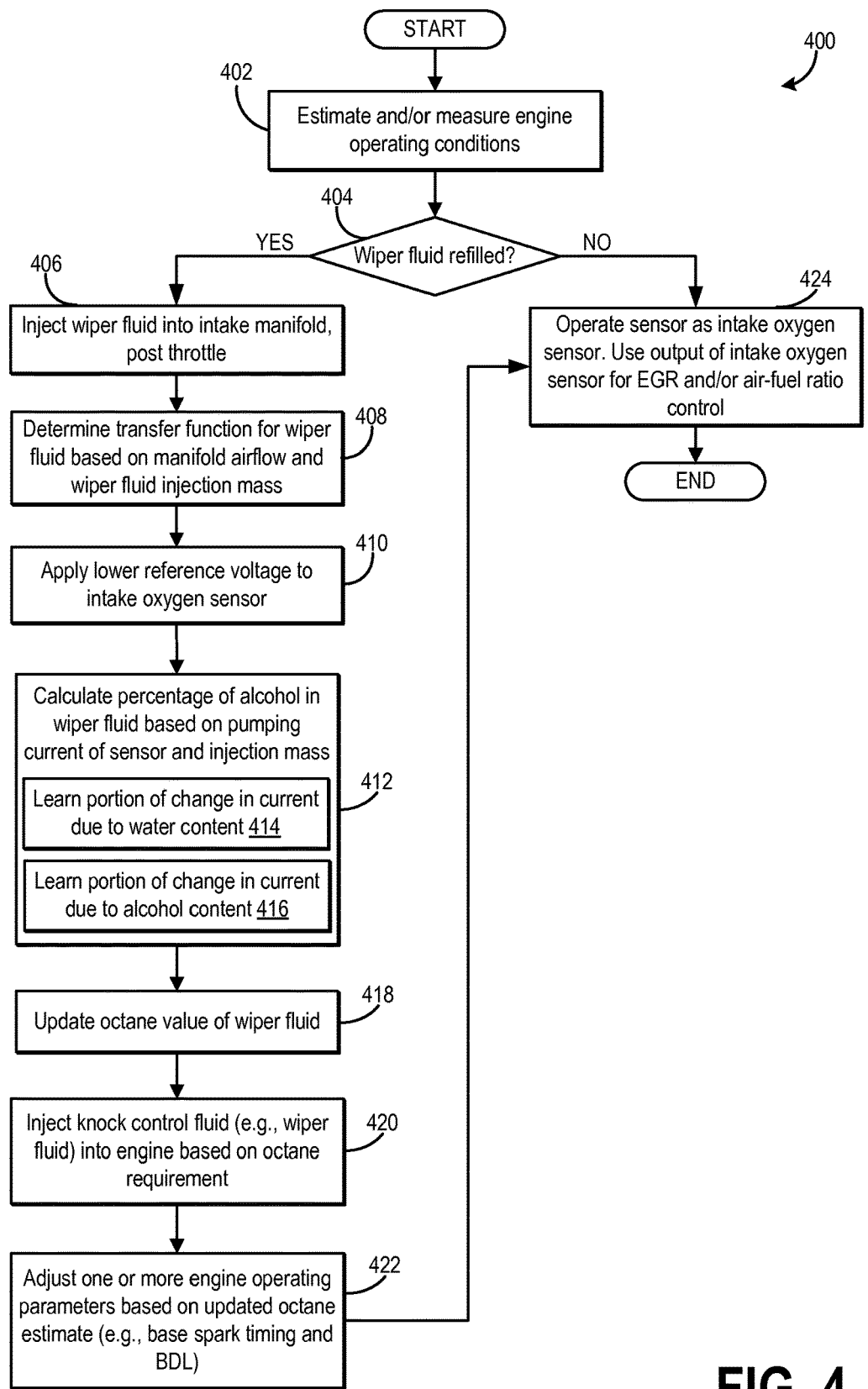
FIG. 4 shows a flow chart illustrating a routine for using an intake oxygen sensor for knock control fluid alcohol estimation.

Turning now to FIG. 4, an example routine 400 is shown for using an intake oxygen sensor (such as sensor 172 of FIGS. 1-2) for estimating the alcohol content and/or composition of an injected wiper fluid based on a change in pumping current of the intake oxygen sensor. The method enables the composition of the wiper fluid to be determined accurately, and without the need for additional sensors.

At 402, the method includes estimating and/or measuring engine operating conditions. These include, for example, engine speed, engine load, boost, ambient conditions (temperature, pressure, humidity), EGR, air-fuel ratio, etc.

At 404, it may be determined if wiper fluid has been recently refilled in the wiper fluid reservoir. In particular, the wiper fluid composition estimation may be triggered by a recent wiper fluid refill event. This allows the composition of the available wiper fluid to be accurately known. Consequently, the wiper fluid may be more reliably used for knock control in addition to wiper washing functions. In alternate examples, the composition may be estimated in response to an operator request for wiper fluid composition estimation. For example, the composition of the wiper fluid may be determined periodically, such as once every threshold distance of vehicle travel, once every duration of engine operation or vehicle travel, once every threshold number of engine cycles, etc.

Herein, the wiper fluid (also referred to as a windshield washer fluid or just washer fluid) is a water-alcohol blend that includes no gasoline. In other words, the alcohol is the only source of hydrocarbons in the wiper fluid. In one example, the alcohol in the water-alcohol blend is one or more of ethanol, methanol, propanol, isopropanol, etc. It will be appreciated that while the present routine depicts the composition estimation of a wiper fluid to enable the fluid to be also leveraged as a knock control fluid, this is not meant to be limiting, and in other examples, the composition of an engine coolant fluid may be determined via the use of the intake oxygen sensor to enable the fluid to be also leveraged as a knock control fluid.

If wiper fluid has not been refilled in the reservoir, or if other wiper fluid composition estimation conditions have not been met, then at 424, the method includes continuing to operate the intake oxygen sensor as an oxygen sensor. Further, one or more engine operating parameters are adjusted based on the output of the oxygen sensor. As non-limiting examples, the output of the intake oxygen sensor may be used for EGR estimation and EGR control, as well as combustion air-fuel ratio control. For example, based on the estimated oxygen concentration of the intake aircharge, an amount of EGR delivered to the engine intake may be adjusted (e.g., to provide a desired engine dilution or a desired combustion air-fuel ratio). As another example, based on the estimated oxygen concentration of the intake aircharge, cylinder fueling may be adjusted.

If wiper fluid has been refilled in the reservoir, or if other wiper fluid composition estimation conditions have been met, then at 406, the method includes injecting an amount (herein also referred to as the injection mass) of the wiper fluid into the intake passage, downstream of the intake throttle (and upstream of the intake valve). In one example, the injection mass is set to be an amount that will provide a significant change in the output of the intake oxygen sensor.

At 408, a transfer function may be determined for the wiper fluid based on the intake manifold airflow level (as determined, for example, based on the output of a MAF sensor), as well as the wiper fluid injection mass. The transfer function may represent an expected change in pumping current of the intake oxygen sensor with injection mass, for a given reference voltage. This change is then compared to a baseline reading of the oxygen concentration when no washer fluid is injected. Similarly, the manifold airflow may be interpreted from a MAP sensor and a look-up table that determines the air mass flow rate in a speed-density system. At 410, a first pumping voltage (herein also called as the reference voltage) ($V_1$) is applied to the oxygen sensor. The first pumping voltage may be a lower reference voltage that pumps oxygen from the oxygen pumping cell, but may have a low enough value so as to not dissociate water (e.g., $H_2O$) molecules in the pumping cell (e.g., $V_1$=450 mV). When the first voltage is applied to the pumping cell, a first pumping current ($I_1$) may be generated. In this example, because wiper fluid is injected into the engine intake manifold, the first pumping current may be indicative of an amount of oxygen in that either reacted with the sensing element of the oxygen sensor, or was displaced due to the dilution effect of the water. At 412, the method includes determining the composition of the wiper fluid based on the output of the intake oxygen sensor. In particular, change in the pumping current of the sensor may be monitored following the applying of the lower pumping voltage, and a controller may estimate the composition of the wiper fluid by learning a first portion of the change in pumping current due to a water content of the fluid, while learning a second portion of the change in pumping current due to an alcohol content of the blend. In particular, an alcohol content of (e.g., a percentage alcohol in) the wiper fluid is determined based on the change in sensor pumping current and further based on the fluid injection mass (as injected at 406). The estimating of an alcohol content of the water-alcohol blend includes, at 414, learning a first portion of the change in pumping current due to a water content of the blend, and at 416, learning a second portion of the change in pumping current due to an alcohol content of the blend.

Figure 6:
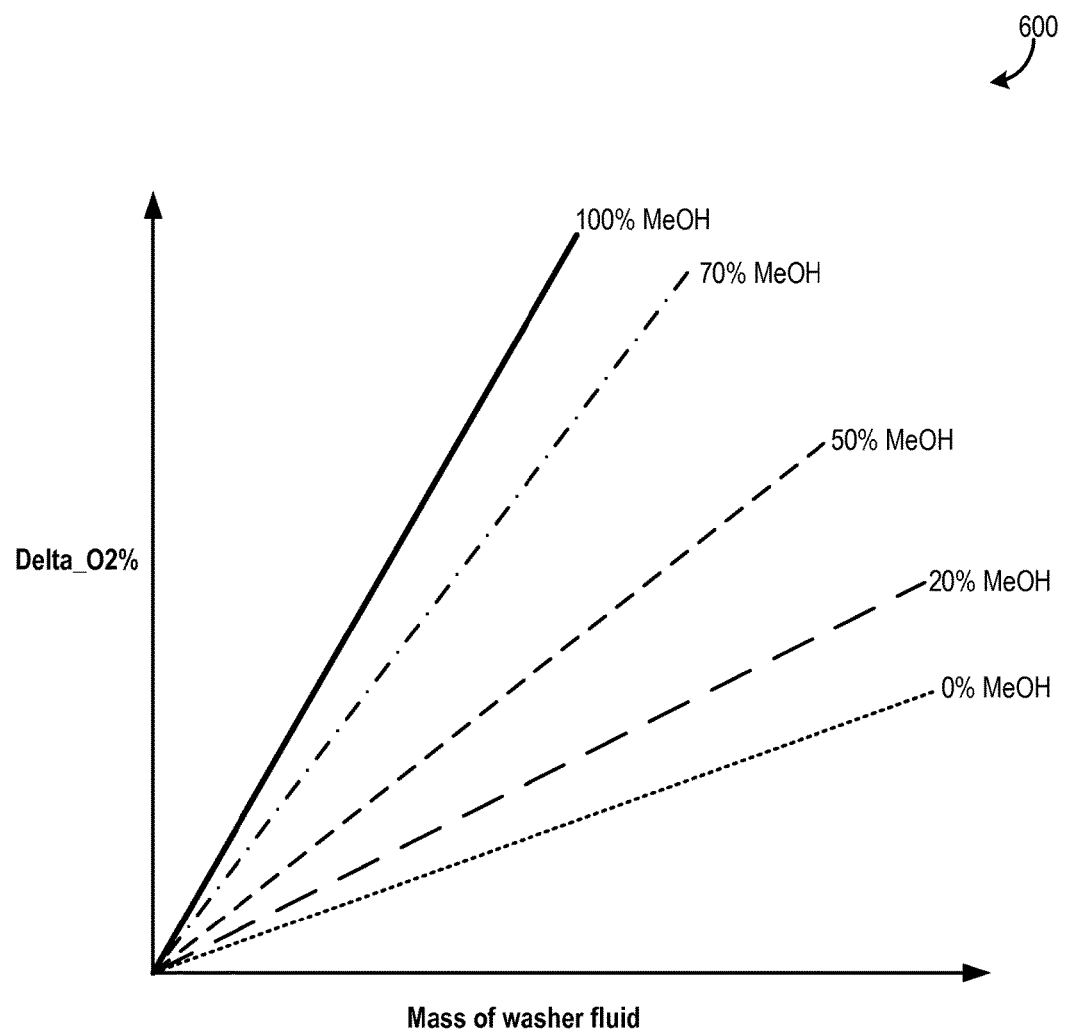
FIG. 6 shows a map demonstrating an example relationship between an alcohol content of a knock control fluid relative and each of a change in the pumping current of an oxygen sensor, and a mass of the knock control fluid injected into an engine.

In one example, an amount of water in the sample may be determined based on the first pumping current and the transfer function. The amount of alcohol may then be identified based on the estimated water content. Because ambient humidity may also contribute to an amount of water in the intake charge, an ambient humidity estimate (as determined by a dedicated humidity sensor or detected by an intake or exhaust gas oxygen sensor during selected conditions) may be subtracted from the determined amount of water. In some embodiments, the computer readable storage medium of the control system receiving communication from the sensor may include instructions for identifying the amount of alcohol by referring to a graph depicting examples of the relationship between change in oxygen sensor output and injection mass with change in percent alcohol content of the wiper fluid (as discussed below with reference to FIG. 6), the graph data stored on the computer readable storage medium in the form of a lookup table, for example. Therein, as the amount of alcohol (e.g., ethanol or methanol) in the injected wiper fluid increases, the amount of water estimated by the intake oxygen sensor may correspondingly decrease. As shown in FIG. 6, for a given mass of washer fluid injected into the intake air stream, a higher change (delta) in intake oxygen sensor output will reflect a higher methanol-to-water ratio. Consequently, the change in oxygen percentage (delta_O2%) will be closer to the 100% MeOH line, and the engine controller may determine/identify the line with constant methanol concentration that corresponds to that operating point.

In particular, Applicants have recognized that the effect of the water component of the water-alcohol blend on the intake oxygen sensor pumping current is distinct from the effect of the alcohol component (including the alcohol content and the alcohol type) of the water-alcohol blend on the intake oxygen sensor pumping current. For example, injecting 1% water (by volume) into intake air results in a 0.2% reduction in oxygen concentration as measured by the intake oxygen sensor since it has a dilution effect on the oxygen concentration. However, injecting 1% methanol (by volume) into intake air results in a 1.5% reduction in oxygen concentration as measured by the intake oxygen sensor due to methanol combusting with the oxygen at the oxygen sensor's sensing element as indicated below.

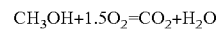

$$CH_3OH+1.5O_2=CO_2+H_2O$$

Hence, if a 2% of the washer fluid (water+methanol) mixture is injected, this will result in a total reduction in oxygen of 2.5% (in this example), 0.2/1.7 or 11.7% of that reduction is due to water, and a remaining 1.5/1.7 or 88.3% of that reduction is due to methanol.

Thus, learning the first portion may include determining a first value of methanol-to-water concentration in the blend (based on the change in pumping current). Further, learning the second portion may include determining a second value of methanol-to-water concentration in the blend that is learned based on the monitored change in pumping current and further based on the amount of water-alcohol blend injected. Herein, the second value may be reflective of a base concentration of oxygen in the ambient air. In addition, the controller may compare the first value to the second value.

As an example, the controller may reference a look-up table or a map, such as the example map of FIG. 6, to determine the percentage of alcohol in the knock control fluid. The map may be a 3D map requiring 2 inputs, the mass of fluid injected and the change in intake oxygen sensor pumping current, to provide an output regarding the percentage of alcohol in the injected knock control fluid.

Referring to FIG. 6, map 600 depicts one such example map. In particular, map 600 depicts change in intake oxygen sensor along the y-axis (Delta_O2%) and injection mass of washer fluid (M_washer_fluid_inj) along the y-axis. Herein, the washer fluid is a water-methanol blend that includes no gasoline. The map is calibrated for 0% methanol (MeOH) and 100% methanol, as well as one or more intermediate methanol percentages. As can be seen, for a given injection mass, with increasing methanol content, a larger change in oxygen sensor output is observed. In other words, using the map, the methanol percentage (Methanolpct) may be estimated as: Methanol_pct=fn (delta_O2, M_washer_fluid_inj). Thus, using a map such as the map of FIG. 6, a controller may be able to estimate the alcohol (e.g., methanol) content of the injected wiper fluid.

Returning to FIG. 4, a composition of the water-alcohol blend wiper fluid based on the learned first portion and second portion, and further based on the injection amount. That is, based on the alcohol content of the water-alcohol blend wiper fluid, the composition of the water-alcohol blend may be determined and updated.

At 418, upon learning the composition of the wiper fluid, an octane value of the fluid is updated. In addition, a fuel octane estimate for the engine system may be updated. For example, an octane modifier term using during feed-forward control of knock may be updated. In one example, the updating includes increasing the octane value as the alcohol (ethanol or methanol) content of the wiper fluid increases or as the water content of the wiper fluid decreases.

At 420, upon confirming the composition of the wiper fluid, the fluid may be used as a knock control fluid as required. For example, in response to an indication of knock, or in anticipation of possible knock, an amount of the wiper fluid may be injected based on the octane requirement of the engine (to address the knock) relative to the updated octane value of the fluid.

At 422, one or more engine operating parameters are adjusted based on the updated wiper fluid and fuel octane estimate. For example, a base spark timing applied may be adjusted (e.g., advanced from MBT). As another example, borderline spark value may be adjusted (e.g., advanced). As still another example, one or more of an EGR schedule, VCT schedule, variable compression ratio, dual fuel injection schedule, etc., may be adjusted. Upon completing the wiper fluid composition estimation via the intake oxygen sensor, the method may return to 424 wherein the sensor may resume being operated for oxygen sensing for the purposes of EGR control, air-fuel ratio control, and the like.

In this way, wiper fluid composition estimation can be improved, allowing the use of the fluid to be expanded to other functions. For example, the composition estimation may allow for improved usage of wiper fluid outside of windshield wiping, or of engine coolant outside of engine cooling. In particular, the wiper fluid and/or the engine coolant may be used more reliably and consistently as a knock control fluid for addressing knock. By improving the usage of a water-alcohol blend in the mitigation of knock, octane requirements of fuel can be reduced, while knock is addressed, allowing more power to be gained from the engine. In addition, by reducing the need for spark retard, fuel economy benefits are achieved.

Figure 5:
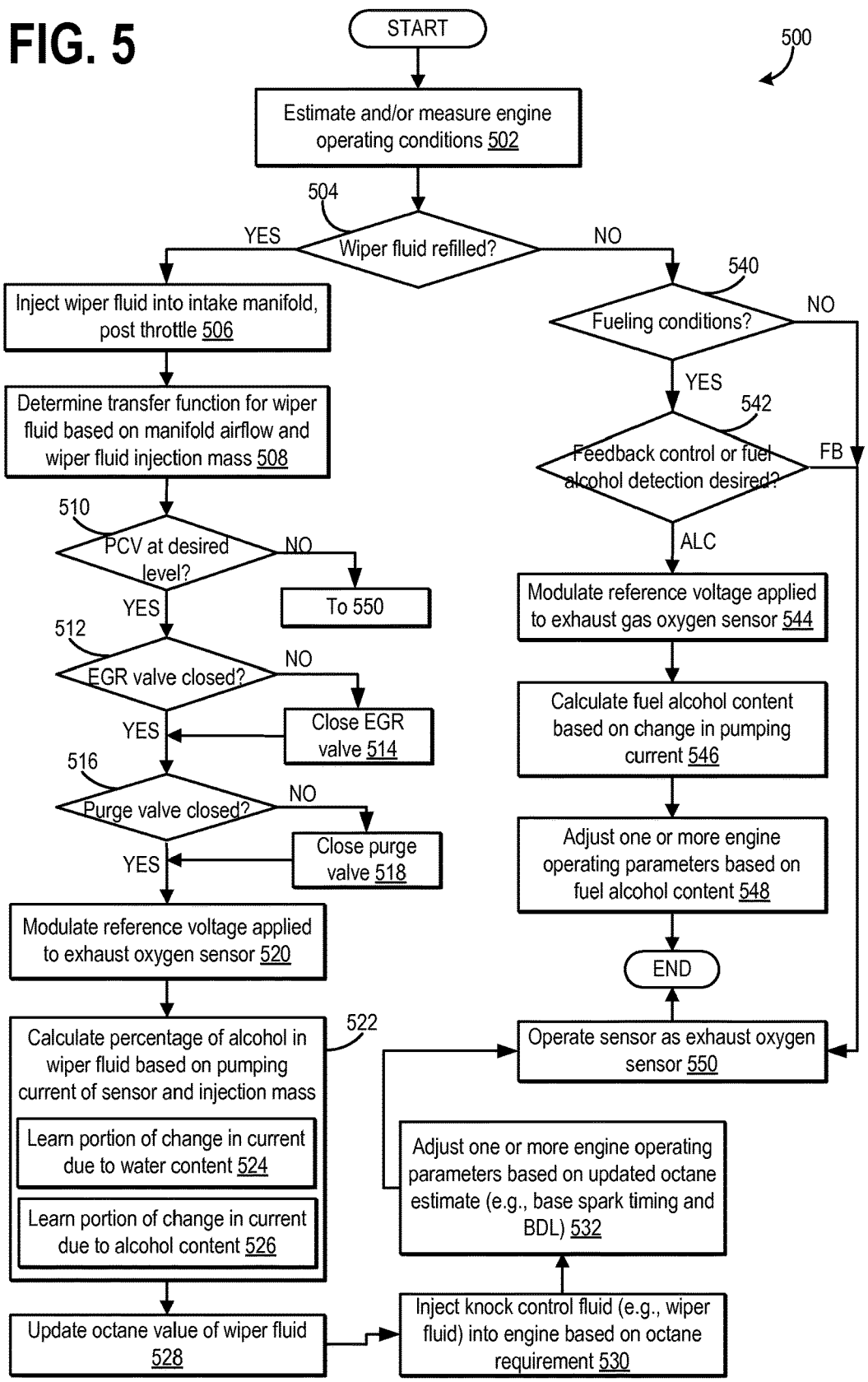
FIG. 5 shows a flow chart illustrating a routine for using an exhaust oxygen sensor for knock control fluid alcohol estimation.

Turning now to FIG. 5, an example routine 500 is shown for using an exhaust oxygen sensor (such as sensor 225 of FIGS. 1-2) for estimating the alcohol content and/or composition of an injected wiper fluid based on a change in pumping current of the exhaust oxygen sensor. The method enables the composition of the wiper fluid to be determined accurately, and without the need for additional sensors.

At 502, the method includes estimating and/or measuring engine operating conditions. These include, for example, engine speed, engine load, boost, ambient conditions (temperature, pressure, humidity), EGR, air-fuel ratio, etc.

At 504, it may be determined if wiper fluid has been recently refilled in the wiper fluid reservoir. In particular, the wiper fluid composition estimation may be triggered by a recent wiper fluid refill event. This allows the composition of the available wiper fluid to be accurately known. Consequently, the wiper fluid may be more reliably used for knock control in addition to wiper washing functions. In alternate examples, the composition may be estimated in response to an operator request for wiper fluid composition estimation. For example, the composition of the wiper fluid may be determined periodically, such as once every threshold distance of vehicle travel, once every duration of engine operation or vehicle travel, once every threshold number of engine cycles, etc.

Herein, the wiper fluid (also referred to as a windshield washer fluid or just washer fluid) is a water-alcohol blend that includes no gasoline. In other words, the alcohol is the only source of hydrocarbons in the wiper fluid. In one example, the alcohol in the water-alcohol blend is one or more of ethanol, methanol, propanol, isopropanol, etc. It will be appreciated that while the present routine depicts the composition estimation of a wiper fluid to enable the fluid to be also leveraged as a knock control fluid, this is not meant to be limiting, and in other examples, the composition of an engine coolant fluid may be determined via the use of the intake oxygen sensor to enable the fluid to be also leveraged as a knock control fluid.

If wiper fluid has not been refilled in the reservoir, or if other wiper fluid composition estimation conditions have not been met, then at 540, it may be determined if fueling conditions are present. Fueling conditions include vehicle acceleration conditions and engine operating conditions in which the fuel supply is uninterrupted and the engine continues spinning with at least one intake valve and one exhaust valve operating; and with air flowing through one or more of the cylinders. Under fueling conditions, combustion is carried out in the combustion chamber and ambient air may move through the cylinder from the intake to the exhaust.

In comparison, non-fueling conditions include vehicle deceleration conditions and engine operating conditions in which the fuel supply is interrupted but the engine continues spinning and at least one intake valve and one exhaust valve are operating; thus, air is flowing through one or more of the cylinders, but fuel is not injected in the cylinders. Under non-fueling conditions, combustion is not carried out but ambient air may move through the cylinder from the intake to the exhaust.

If fueling conditions are confirmed, at 542, the method includes determining if feedback air-fuel ratio control based on the sensor, or alcohol detection by the sensor, is desired or to be carried out. The selection may be based on operating conditions, such as a duration since a last determination of alcohol, or whether closed loop air-fuel ratio control is enabled. For example, if feedback air-fuel ratio control is disabled, the routine may continue to determine alcohol content, whereas if feedback air-fuel ratio is commanded or enabled, the routine may continue to perform such feedback air-fuel ratio control (without determining alcohol content). If it is determined that feedback control is desired, or if fueling conditions are not confirmed at 540, the method moves to 550 and the sensor is operated as an exhaust oxygen (e.g., $O_2$) sensor to determine an oxygen concentration and/or air-fuel ratio of the exhaust gas. Further, one or more engine operating parameters are adjusted based on the output of the oxygen sensor. As non-limiting examples, the output of the exhaust oxygen sensor may be used for EGR estimation and EGR control, as well as combustion air-fuel ratio control. Then the routine ends.

If alcohol detection is desired, the method proceeds to 544 where it is first confirmed that the exhaust gas recirculation (EGR) valve is already closed (else the valve is actively closed). This ensures that the amount of EGR entering the combustion chamber is substantially zero. Next, the method includes modulating a reference voltage applied to the exhaust gas sensor. Specifically, a first pumping voltage ($V_1$) and a second pumping voltage ($V_2$) are sequentially applied to the exhaust gas sensor. The first pumping voltage may pump oxygen from the oxygen pumping cell, but may have a low enough valve so as to not dissociate water (e.g., $H_2O$) molecules in the pumping cell (e.g., $V_1$=450 mV). In some examples, the first pumping voltage applied to the sensor at 544 may be the same as the first pumping voltage applied to the sensor at 410 of FIG. 4. When the first voltage is applied to the pumping cell, a first pumping current ($I_1$) may be generated. In this example, because fuel is injected to the engine and combustion is carried out, the first pumping current may be indicative of an amount of oxygen in the exhaust gas.

The second pumping voltage ($V_2$) applied to the pumping cell of the exhaust gas sensor. may be greater than the first pumping voltage, and the second voltage may be high enough to dissociate oxygen compounds such as water molecules. Application of the second pumping voltage across the oxygen pumping cell may generate a second pumping current ($I_2$). The second pumping current may be indicative of an amount of oxygen and water in the sample gas (e.g., oxygen that already exists in the sample gas plus oxygen from water molecules dissociated when the second pumping voltage is applied).

Once the first and second pumping currents are generated, an alcohol content of the fuel may be determined based on an amount of water in the sample gas at 546. For example, the first pumping current may be subtracted from the second pumping current to determine a value that corresponds to an amount of water. Then, the amount of alcohol in the fuel may be identified. For example, the amount of water in the exhaust gas may be proportional to an amount of alcohol (e.g., a percent of ethanol) in the fuel injected to the engine. Because ambient humidity may also contribute to an amount of water in the exhaust gas, an ambient humidity estimate may be subtracted from the determined amount of water. In some embodiments, the computer readable storage medium of the control system receiving communication from the sensor may include instructions for identifying the amount of alcohol based on a look-up table that uses the change in pumping current as an input.

Upon learning the fuel alcohol content of the injected fuel, at 548, a fuel octane estimate is updated. For example, an octane modifier term using during feed-forward control of knock may be updated. In one example, the updating includes increasing the fuel octane estimate as the alcohol content of the injected fuel increases. Further, one or more engine operating parameters are adjusted based on the updated fuel octane estimate. For example, a base spark timing applied may be adjusted (e.g., advanced from MBT). As another example, borderline spark value may be adjusted (e.g., advanced from MBT). As still another example, an EGR schedule of the engine may be adjusted.

Returning to 504, if the wiper fluid is refilled, or if other wiper fluid composition estimation conditions have been met, then at 506, the method includes injecting an amount (herein also referred to as the injection mass) of the wiper fluid into the engine. In one example, the wiper/washer fluid may be injected into the intake passage, downstream of the intake throttle (and upstream of the exhaust valve). In another example, an engine fuel injector may inject the wiper/washer fluid directly inside the cylinder. Herein, since the washer fluid composition is to be detected using exhaust gas, the fluid can be injected and combusted in the cylinder. In one example, the injection mass of the wiper fluid injection is set to be an amount that will provide a significant change in the output of the exhaust oxygen sensor. At 508, a transfer function may be determined for the wiper fluid based on the intake manifold airflow level (as determined, for example, based on the output of a MAF sensor), as well as the wiper fluid injection mass. The transfer function may represent an expected change in pumping current of the exhaust oxygen sensor with injection mass, for a given reference voltage. Similarly, the manifold airflow may be interpreted from a MAP sensor and a look-up table that determines the air mass flow rate in a speed-density system. While the engine is being fueled and cylinder are combusting, at 510, the method includes determining if the amount of positive crankcase ventilation (PCV) is at a desired level. Herein, the desired level may include PCV being lower than a threshold amount. In one example, it may be desired that there be substantially no PCV flow. As an example, if the engine is operating in a higher speed range, there may be increased PCV flow from the engine crankcase into the intake manifold. Other example conditions where PCV flow is elevated include increased manifold vacuum conditions, increased crankcase pressure conditions, high ambient temperature conditions, combinations thereof, etc. As such, wiper fluid alcohol content estimation may be enabled only during conditions when PCV flow is lower than a threshold level (e.g., when PCV is disabled) to reduce interference from PCV hydrocarbons.

If the PCV flow is above the desired level (e.g., the PCV flow is high), the method returns to 550 wherein the sensor is operated as an exhaust oxygen sensor to determine an oxygen concentration of the intake air for air-fuel control, for example, and the routine ends.

On the other hand, if PCV is at a desired level (e.g., the PCV flow is low), the method continues to 512 where it is determined if the exhaust gas recirculation (EGR) valve is closed. If it is determined that the EGR valve is open, the method moves to 514 and the EGR valve is closed. As such, wiper fluid alcohol content estimation may be enabled only during conditions when EGR flow is lower than a threshold level (e.g., when EGR is disabled) to reduce interference from EGR hydrocarbons.

Once the EGR valve is closed or if it is determined that the EGR valve is closed at 512, and thus the amount of EGR entering the combustion chamber is substantially zero, the method proceeds to 516 where it is determined if the fuel vapor purge valve is closed. If it is determined that the fuel vapor purge valve is open, the method moves to 518 and the fuel vapor purge valve is closed. Fuel vapor that is stored in the fuel vapor canister may also have an alcohol content and may corrupt the results of a wiper fluid composition estimation. In particular, fuel vapor entering the combustion chamber may affect the amount of alcohol detected by the exhaust oxygen sensor resulting in an inaccurate estimate. Thus, wiper fluid composition estimation may be enabled only during conditions when purge flow is lower than a threshold level (e.g., when canister purge is disabled). By recording the response of the exhaust oxygen sensor to injection of a knock control fluid in the absence of EGR, PCV, or purge, a more accurate estimate of the air-fuel ratio of the water-alcohol blend being injected is achieved. As such, this provides an improvement in the fuel economy and performance of the engine system.

Once the fuel vapor purge valve is closed at 518 or if is determined that the fuel vapor purge valve is closed at 516, the method continues to 520 wherein the method includes modulating a reference voltage of the exhaust oxygen sensor. The modulating includes alternating the reference voltage of the oxygen sensor between a first voltage and a second voltage, the first and second voltages applied successively. In particular, a first pumping voltage ($V_1$) may be initially applied to the exhaust oxygen sensor. The first pumping voltage may pump oxygen from the oxygen pumping cell, but may have a low enough value so as to not dissociate water (e.g., $H_2O$) molecules in the pumping cell (e.g., $V_1$=450 mV). In some examples, the first pumping voltage applied to the sensor for estimating the alcohol content of the wiper fluid may be the same as the first pumping voltage applied to the sensor for estimating the alcohol content of the injected fuel (as detailed at 544). When the first voltage is applied to the pumping cell, a first pumping current ($I_1$) may be generated. In this example, the first pumping current may be indicative of an amount of oxygen in the aircharge.

The modulating then includes applying a second pumping voltage ($V_2$) to the pumping cell of the exhaust oxygen sensor. The second pumping voltage may be greater than the first pumping voltage, and the second voltage may be high enough to dissociate oxygen compounds such as water molecules (e.g., $V_2$=950 or 1050 mV). Application of the second pumping voltage across the oxygen pumping cell may generate a second pumping current ($I_2$). The second pumping current may be indicative of an amount of oxygen and water in the sample gas (e.g., oxygen that already exists in the sample gas plus oxygen from water molecules dissociated when the second pumping voltage is applied).

After the first and second pumping currents are generated, a change in the pumping current of the sensor is monitored. At 522, an alcohol content of (e.g., a percentage alcohol in) the wiper fluid is determined based on the change in sensor pumping current and further based on the fluid injection mass (as injected at 506). The estimating of an alcohol content of the water-alcohol blend includes, at 524, learning a first portion of the change in pumping current due to a water content of the blend, and at 526, learning a second portion of the change in pumping current due to an alcohol content of the blend.

In one example, an amount of water in the sample may be determined by subtracting the first pumping current from the second pumping current. The amount of alcohol in the wiper fluid may then be identified based on the estimated water content. For example, the amount of water in the fluid may be proportional to an amount of alcohol (e.g., a percent of ethanol or methanol) in the injected water-alcohol blend. Because ambient humidity may also contribute to an amount of water in the intake charge, an ambient humidity estimate (as determined by a dedicated humidity sensor or detected by an exhaust gas oxygen sensor, or the intake oxygen sensor during other selected conditions) may be subtracted from the determined amount of water. In some embodiments, the computer readable storage medium of the control system receiving communication from the sensor may include instructions for identifying the amount of alcohol by referring to a graph depicting examples of the relationship between change in oxygen sensor output and injection mass water with change in percent alcohol content of a knock control fluid (as discussed above with reference to FIG. 6), the graph data stored on the computer readable storage medium in the form of a lookup table, for example. Therein, as the amount of alcohol (e.g., ethanol or methanol) in the injected wiper fluid increases, the amount of water estimated by the intake oxygen sensor may correspondingly decrease. As shown in FIG. 6, for a given mass of washer fluid injected into the intake air stream or engine cylinder, a higher change (delta) in Oxygen sensor output will reflect a higher methanol-to-water ratio; in this case the delta_O2% will be closer to the 100% MeOH line, and the engine controller may determine the line with constant methanol concentration that corresponds to that operating point.

In particular, Applicants have recognized that the effect of the water component of the water-alcohol blend on the exhaust oxygen sensor pumping current is distinct from the effect of the alcohol component (including the alcohol content and the alcohol type) of the water-alcohol blend on the exhaust oxygen sensor pumping current. For example, injecting 1% water (by volume) into intake air results in a 0.2% reduction in oxygen concentration as measured by the exhaust oxygen sensor since it has a dilution effect on the oxygen concentration. However, injecting 1% methanol (by volume) into intake air results in a 1.5% reduction in oxygen concentration as measured by the exhaust oxygen sensor due to methanol combusting with the oxygen at the oxygen sensor's sensing element as indicated below.

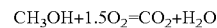

$$CH_3OH+1.5O_2=CO_2+H_2O$$

Hence, if 2% of the wiper fluid (water+methanol) mixture is injected, this will result in a total reduction in oxygen of 2.5% (in this example), 0.2/1.7 or 11.7% of that reduction is due to water, and a remaining 1.5/1.7 or 88.3% of that reduction is due to methanol.

Thus, learning the first portion may include determining a first value of methanol-to-water concentration in the blend (based on the change in pumping current). Further, learning the second portion may include determining a second value of methanol-to-water concentration in the blend that is learned based on the monitored change in pumping current and further based on the amount of water-alcohol blend injected. Herein, the second value may be reflective of a base concentration of oxygen in the ambient air. In addition, the controller may compare the first value to the second value.

As an example, the controller may reference a look-up table or a map, such as the example map of FIG. 6, to determine the percentage of alcohol in the knock control fluid. As discussed earlier, the map may be a 3D map requiring 2 inputs, the mass of fluid injected and the change in exhaust oxygen sensor pumping current, to provide an output regarding the percentage of alcohol in the injected wiper fluid.

It will be appreciated that in alternate examples, the wiper fluid estimation may be performed using the exhaust gas oxygen sensor during an engine non-fueling condition where at least one intake valve and one exhaust valve are operating. For example, the modulating may be performed during a deceleration fuel shut-off (DFSO) event.

At 528, upon learning the composition of the wiper fluid, an octane value of the fluid is updated. In addition, a fuel octane estimate for the engine system may be updated. For example, an octane modifier term using during feed-forward control of knock may be updated. In one example, the updating includes increasing the octane value as the alcohol (ethanol or methanol) content of the wiper fluid increases or as the water content of the wiper fluid decreases.

At 530, upon confirming the composition of the wiper fluid, the fluid may be used as a knock control fluid as required. For example, in response to an indication of knock, or in anticipation of possible knock, an amount of the wiper fluid may be injected based on the octane requirement of the engine (to address the knock) relative to the updated octane value of the fluid.

At 532, one or more engine operating parameters are adjusted based on the updated wiper fluid and fuel octane estimate. For example, a base spark timing applied may be adjusted (e.g., advanced from MBT). As another example, borderline spark value may be adjusted (e.g., advanced/). As still another example, one or more of an EGR schedule of the engine, VCT schedule, variable compression ratio, dual fuel injection schedule, etc., may be adjusted.

Upon completing the wiper fluid composition estimation via the exhaust oxygen sensor, the method may return to 550 wherein the sensor may resume being operated for oxygen sensing for the purposes of EGR control, air-fuel ratio control, and the like.

In this way, the composition of a wiper fluid as well as an injected fuel can be determined using an exhaust oxygen sensor. For example, during a first condition, a water-alcohol blend may be injected into an engine cylinder and an alcohol composition of the water-alcohol blend may be determined based on a change in pumping current of the exhaust oxygen sensor. Then, during a second condition, a gasoline-alcohol blend may be injected into an engine cylinder and an alcohol composition of the gasoline-alcohol blend may be determined based on a change in pumping current of the exhaust oxygen sensor. By accurately and reliably learning the alcohol content and composition of a wiper fluid, the use of the fluid can be expanded for knock control, improving the robustness of the engine system. By using the same oxygen sensor to estimate the alcohol content of the knock control fluid and the alcohol content of the injected fuel, the need for a dedicated sensor for determining the composition of the knock control fluid is reduced.

One engine method comprises: injecting an amount of a water-alcohol blend; modulating a reference voltage of an exhaust oxygen sensor; monitoring a change in pumping current of the sensor; learning a first portion of the change in pumping current due to a water content of the blend; and learning a second portion of the change in pumping current due to an alcohol content of the blend. In the preceding example, the method may additionally or optionally further comprise, learning a composition of the blend based on the learned first portion and second portion, and further based on the injection amount. In any or all of the preceding examples, the method may additionally or optionally further comprise, adjusting an engine operating parameter based on the learned composition, the engine operating parameter including one or more of a fuel octane estimate and a fuel injection amount. In any or all of the preceding examples, the blend additionally or optionally includes no gasoline and the alcohol includes one or more of ethanol and methanol. In any or all of the preceding examples, the modulating additionally or optionally includes alternating the reference voltage of the oxygen sensor between a first voltage and a second voltage, the first and second voltage applied successively. In any or all of the preceding examples, learning the first portion additionally or optionally includes determining a first value of methanol-to-water concentration in the blend. In any or all of the preceding examples, learning the second portion additionally or optionally includes determining a second methanol-to-water concentration in the blend that is learned based on the monitored change in pumping current and further based on the amount of water-alcohol blend injected, and comparing the first value to the second value. Herein, the second value may be reflective of a base concentration of oxygen in the ambient air. In any or all of the preceding examples, the learning is additionally or optionally performed responsive to selected conditions being met, the selected conditions additionally or optionally including an engine non-fueling condition where at least one intake valve and one exhaust valve are operating. In any or all of the preceding examples, the selected conditions additionally or optionally include an engine fueling condition where each of EGR, purge flow, and crankcase ventilation flow is below a threshold level.

Another example method for an engine, comprises: during a first condition, injecting a water-alcohol blend into an engine cylinder, and learning an alcohol composition of the water-alcohol blend based on a change in pumping current of an exhaust oxygen sensor; and during a second condition, injecting a gasoline-alcohol blend into the engine cylinder, and learning the alcohol composition of the gasoline-alcohol blend based on the change in pumping current of the exhaust oxygen sensor. In the preceding example, the first condition additionally or optionally includes an engine non-fueling condition with at least one intake valve and one exhaust valve operating, and wherein the second condition includes an engine combusting condition with each of EGR, purge, and crankcase ventilation disabled. In any or all of the preceding examples, during each of the first and second conditions, a reference voltage of the exhaust oxygen sensor is additionally or optionally modulated between a first and a second voltage, and the change in pumping current is responsive to the modulation. In any or all of the preceding examples, during the first condition, the alcohol composition of the water-alcohol blend is additionally or optionally further based on an injection mass. In any or all of the preceding examples, during the first condition, learning an alcohol composition of the water-alcohol blend additionally or optionally includes distinguishing a first portion of the change in pumping current due to a water content of the water-alcohol blend from a second portion of the change in pumping current due to an alcohol content of the water-alcohol blend. In any or all of the preceding examples, the water-alcohol blend additionally or optionally includes a first alcohol in a first ratio relative to water, and the gasoline-alcohol blend includes a second alcohol in a second ratio relative to gasoline, the first alcohol different from the second alcohol, the first ratio different from the second ratio. Any or all of the preceding examples may additionally or optionally further comprise, during the first condition, adjusting a knock-mitigating spark retard amount based on the learned alcohol composition of the water-alcohol blend, and during the second condition, adjusting a feedback air-fuel ratio control gains based on the learned alcohol composition of the gasoline-alcohol blend.

Another example engine system comprises: an engine including an intake manifold and an exhaust manifold; a crankcase coupled to the intake manifold via a crankcase ventilation valve; a first injector for injecting fuel into an engine cylinder; a second injector for injecting wiper fluid into the intake manifold downstream of an intake throttle; a canister configured to receive fuel vapors from a fuel tank, the canister coupled to the intake manifold via a purge valve; an EGR system including a passage for recirculating exhaust residuals from the exhaust manifold to the intake manifold via an EGR valve; an oxygen sensor coupled to the exhaust manifold; and a controller. The controller may be configured with computer readable instructions stored on non-transitory memory for: closing each of the EGR valve, purge valve, and crankcase ventilation valve; injecting an amount of knock control fluid into the intake manifold; modulating a reference voltage applied to the oxygen sensor between a first and a second voltage; measuring a change in pumping current of the oxygen sensor; and estimating a composition of the knock control fluid based on the injection amount and the measured change in pumping current. In the preceding example, the knock control fluid additionally or optionally includes water and alcohol and no fuel, and the controller estimates the composition by calculating a first portion of the change in pumping current due to a water content of the knock control fluid and calculating a second portion of the change in pumping current due to an alcohol content of the knock control fluid. In any or all of the preceding examples, the controller may additionally or optionally includes further instructions for: updating a fuel octane estimate based on the estimated composition of the knock control fluid. In any or all of the preceding examples, the controller additionally or optionally includes further instructions for: adjusting each of a spark timing and a borderline spark value applied responsive to knock based on the updated fuel octane estimate, the adjusting including retarding spark timing from a base spark timing, and advancing borderline spark towards MBT as the fuel octane estimate increases.

In this way, based on sensor outputs (e.g., pumping currents) generated responsive to voltages applied to the oxygen pumping cell of an engine system oxygen sensor during selected conditions, a composition of a water-alcohol blend knock control fluid may be determined accurately and reliably. In particular, a change in the sensor output may be correlated with the amount of alcohol in a wiper fluid or engine coolant. In this manner, an accurate indication of the amount of alcohol (e.g., percent ethanol or percent methanol) in the fluid may be identified, allowing the fluid to be used additionally for knock control. Further, once the composition type is determined, various engine operating parameters may be adjusted to maintain engine and/or emissions efficiency, and improve knock controlling spark usage. The technical effect of improving the estimation of a composition of an injected knock control fluid is that the use of the knock control fluid may be expanded.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   injecting an amount of a water-alcohol blend including no gasoline, the water-alcohol blend including water and alcohol;
   modulating a reference voltage of an exhaust oxygen sensor;
   monitoring a change in pumping current of the sensor during the modulating;
   learning a first portion of the change in pumping current due to a water content of the blend based on the monitored change in pumping current; and
   learning a second portion of the change in pumping current due to an alcohol content of the blend based on the monitored change in pumping current and the injected amount.

2. The method of claim 1, wherein the amount of the water-alcohol blend is injected into one of an engine cylinder and an intake manifold of an engine, and further comprising learning a composition of the blend based on the learned first portion and the learned second portion, and further based on the injected amount.

3. The method of claim 2, further comprising adjusting an engine operating parameter based on the learned composition, the engine operating parameter including one or more of a fuel octane estimate and a fuel injection amount.

4. The method of claim 1, wherein the alcohol includes one or more of ethanol and methanol and wherein the water-alcohol blend is wiper fluid.

5. The method of claim 1, wherein the modulating includes alternating the reference voltage of the sensor between a first voltage and a second voltage, the first and second voltages applied successively and the second voltage higher than the first voltage.

6. The method of claim 1, wherein learning the first portion includes determining a first value of methanol-to-water concentration in the blend based on the monitored change in pumping current.

7. The method of claim 6, wherein learning the second portion includes:

determining a second value of methanol-to-water concentration in the blend that is learned based on the monitored change in pumping current and further based on the amount of water-alcohol blend injected, the second value reflecting a base concentration of oxygen in ambient air; and comparing the first value to the second value.

8. The method of claim 1, wherein the method is performed responsive to selected conditions being identified, the selected conditions including an engine non-fueling condition where at least one intake valve and one exhaust valve are operating.

9. The method of claim 1, wherein the method is performed responsive to selected conditions being identified, the selected conditions including an engine fueling condition where each of EGR, purge flow, and crankcase ventilation flow is below a threshold level.

10. A method for an engine, comprising:
operating the engine at a first condition, and, during operation at the first condition, injecting a water-alcohol blend including water and alcohol and containing no gasoline into an engine cylinder, and learning an alcohol composition of the water-alcohol blend based on a change in pumping current of an exhaust oxygen sensor and an injection mass; and
operating the engine at a second condition, and, during operation at the second condition, injecting a gasoline-alcohol blend into the engine cylinder, and learning an alcohol composition of the gasoline-alcohol blend based on the change in pumping current.

11. The method of claim 10, wherein the first condition includes an engine non-fueling condition where the gasoline-alcohol blend is not injected into the engine cylinder and with at least one intake valve and one exhaust valve operating, and wherein the second condition includes an engine combusting condition where the injected gasoline-alcohol blend is combusted and with each of EGR, purge flow, and crankcase ventilation disabled.

12. The method of claim 10, wherein, during each of the first and second conditions, a reference voltage of the exhaust oxygen sensor is modulated between a first voltage and a second voltage, the second voltage higher than the first voltage, and wherein the change in pumping current is responsive to the modulation.

13. The method of claim 12, wherein, during the first condition, the alcohol composition of the water-alcohol blend is learned based on a relationship between the change in pumping current during the modulation, the injection mass, and a percent alcohol content of the water-alcohol blend.

14. The method of claim 10, wherein, during the first condition, learning the alcohol composition of the water-alcohol blend includes distinguishing a first portion of the change in pumping current due to a water content of the water-alcohol blend from a second portion of the change in pumping current due to an alcohol content of the water-alcohol blend.

15. The method of claim 10, wherein the water-alcohol blend includes a first alcohol in a first ratio relative to water, and wherein the gasoline-alcohol blend includes a second alcohol in a second ratio relative to gasoline, the first alcohol different from the second alcohol, the first ratio different from the second ratio.

16. The method of claim 10, further comprising, during the first condition, adjusting a knock-mitigating spark retard amount based on the learned alcohol composition of the water-alcohol blend, and, during the second condition, adjusting feedback air-fuel ratio control gains based on the learned alcohol composition of the gasoline-alcohol blend.

17. An engine system, comprising:
an engine including an intake manifold and an exhaust manifold;
a crankcase coupled to the intake manifold via a crankcase ventilation valve;
a first injector for injecting fuel into an engine cylinder;
a second injector for injecting wiper fluid into the intake manifold downstream of an intake throttle;
a canister configured to receive fuel vapors from a fuel tank, the canister coupled to the intake manifold via a purge valve;
an EGR system including a passage for recirculating exhaust residuals from the exhaust manifold to the intake manifold via an EGR valve;
an oxygen sensor coupled to the exhaust manifold; and
a controller with computer readable instructions stored on non-transitory memory for:
closing each of the EGR valve, the purge valve, and the crankcase ventilation valve;
injecting an amount of wiper fluid via the second injector into the intake manifold, the wiper fluid including water and alcohol and no gasoline;
modulating a reference voltage applied to the oxygen sensor between a first voltage and a second voltage;
measuring a change in pumping current of the oxygen sensor during the modulating; and
estimating a composition of the wiper fluid based on the injection amount and the measured change in pumping current.

18. The system of claim 17, wherein the wiper fluid includes a combination of water and alcohol and no gasoline, and wherein the controller estimates the composition by calculating a first portion of the change in pumping current due to a water content of the wiper fluid and calculating a second portion of the change in pumping current due to an alcohol content of the wiper fluid.

19. The system of claim 17, wherein the controller includes further instructions for:
updating a fuel octane estimate based on the estimated composition of the wiper fluid.

20. The system of claim 19, wherein the controller includes further instructions for:
adjusting each of a spark timing and a borderline spark value applied responsive to knock based on the updated fuel octane estimate, the adjusting including retarding spark timing from a base spark timing, and advancing the borderline spark value towards MBT as the fuel octane estimate increases.

* * * * *